United States Patent
Han et al.

(10) Patent No.: US 10,019,932 B2
(45) Date of Patent: Jul. 10, 2018

(54) METHOD FOR WRITING DISPLAY DATA, DISPLAY APPARATUS AND MOBILE TERMINAL INCLUDING THE DISPLAY APPARATUS

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Wenchu Han, Beijing (CN); Taehyun Kim, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu (CN)

( * ) Notice: Subject to any disclaimer, the term of this patent is extended or adjusted under 35 U.S.C. 154(b) by 313 days.

(21) Appl. No.: 14/779,873

(22) PCT Filed: Mar. 17, 2015

(86) PCT No.: PCT/CN2015/074356
§ 371 (c)(1),
(2) Date: Sep. 24, 2015

(87) PCT Pub. No.: WO2016/065801
PCT Pub. Date: May 6, 2016

(65) Prior Publication Data
US 2016/0329013 A1  Nov. 10, 2016

(30) Foreign Application Priority Data
Oct. 29, 2014  (CN) .......................... 2014 1 0594750

(51) Int. Cl.
*G06F 3/147* (2006.01)
*H04N 19/423* (2014.01)
(Continued)

(52) U.S. Cl.
CPC .......... *G09G 3/2096* (2013.01); *G06F 3/147* (2013.01); *G06T 1/60* (2013.01); *G09G 3/20* (2013.01);
(Continued)

(58) Field of Classification Search
None
See application file for complete search history.

(56) References Cited

U.S. PATENT DOCUMENTS 6,377,713 B1 * 4/2002 Vuong .................. G06T 3/4007
348/567
2002/0057265 A1 * 5/2002 Tamura .................. G06F 3/147
345/204

(Continued)

FOREIGN PATENT DOCUMENTS

| CN | 101004901 A | 7/2007 |
| CN | 101188100 A | 5/2008 |

(Continued)

OTHER PUBLICATIONS

Second Office Action regarding Chinese Application No. 201410594750.6, dated Jul. 4, 2017. Translation provided by Dragon Intellectual Property Law Firm.
(Continued)

*Primary Examiner* — Joni Richer
(74) *Attorney, Agent, or Firm* — Harness, Dickey & Pierce, P.L.C.

(57) ABSTRACT

One embodiment of the present disclosure provides a method for writing display data, a display apparatus and a mobile terminal. The method includes: compressing, into a
(Continued)

compressed package, display data to be written into a display unit within at least two clock cycles, and sending the compressed package to a driving unit; storing the received compressed package into a cache, and when each clock cycle comes, decompressing, by the driving unit, from the compressed package display data to be written into the display unit within the each clock cycle, and writing the display data to be written into the display unit within the each clock cycle into the display unit.

17 Claims, 2 Drawing Sheets

(51) Int. Cl.
  *G06T 1/60* (2006.01)
  *G09G 3/20* (2006.01)

(52) U.S. Cl.
  CPC ... *H04N 19/423* (2014.11); *G09G 2300/0408* (2013.01); *G09G 2310/0272* (2013.01); *G09G 2330/021* (2013.01); *G09G 2340/02* (2013.01); *G09G 2370/08* (2013.01)

(56) References Cited

U.S. PATENT DOCUMENTS

| | | | |
|---|---|---|---|
| 2005/0206656 A1* | 9/2005 | Cooper | G06T 11/203 345/660 |
| 2008/0106510 A1 | 5/2008 | Yin | |
| 2013/0100121 A1* | 4/2013 | Cha | H04N 19/597 345/419 |

FOREIGN PATENT DOCUMENTS

| | | |
|---|---|---|
| CN | 102982759 A | 3/2013 |
| CN | 103065604 A | 4/2013 |
| CN | 103794182 A | 5/2014 |
| CN | 104407826 A | 3/2015 |
| JP | 2010096951 A | 4/2010 |
| KR | 20060036953 A | 5/2006 |

OTHER PUBLICATIONS

First Office Action regarding Chinese application No. 201410594750.6, dated Dec. 22, 2016. Translation provided by Dragon Intellectual Property Law Firm.

International Search Report and Written Opinion of the International Searching Authority for International application No. PCT/CN2015/074356, dated Jul. 14, 2015. Translation provided by Dragon Intellectual Property Law Firm.

* cited by examiner

METHOD FOR WRITING DISPLAY DATA, DISPLAY APPARATUS AND MOBILE TERMINAL INCLUDING THE DISPLAY APPARATUS

CROSS-REFERENCE TO RELATED APPLICATIONS

This application is the U.S. national phase of PCT Application No. PCT/CN2015/074356 filed on Mar. 17, 2015, which claims a priority to Chinese Patent Application No. 201410594750.6 filed on Oct. 29, 2014, the disclosures of which are incorporated in their entirety by reference

TECHNICAL FIELD

The present disclosure relates to the field of display technology, and in particular to a method for writing display data, a display apparatus and a mobile terminal.

BACKGROUND

In the related art, a host unit of a display apparatus generally writes display data into a display panel in one of the following two ways.

As shown in FIG. 1, in the first way, when each clock cycle comes, one row of display data to be written into the display panel within the clock cycle (only one row of display data is written within each clock cycle in the display apparatus) is sent to a driving unit, and then the driving unit directly writes the display data into the display panel. By this way, there is no need to arrange a cache in the driving unit, or only a small capacity cache is required in the driving unit, thereby the display apparatus may be made light and thin. However, this way has disadvantages such as high frequency of sending display data and high power consumption.

As shown in FIG. 2, in the second way, a plurality of rows of display data (generally one third of a frame of image) is sent to and stored in a driving unit at a time, such that when each clock cycle come, one row of display data is written into the display panel. By this way, power consumption may be reduced, however a large capacity cache is required in the driving unit, and then the display apparatus may not be made light and thin.

SUMMARY

One object of the present disclosure is to provide a method for writing display data, which can reduce power consumption without arranging a large capacity cache in a driving unit.

In order to achieve the above object, a method for writing display data is provided, including:
  compressing, into a compressed package, display data to be written into a display unit within at least two clock cycles, and sending the compressed package to a driving unit; and
  storing, by the driving unit, the received compressed package into a cache, and when each clock cycle comes, decompressing from the compressed package display data to be written into the display unit within the each clock cycle, and writing the display data to be written into the display unit within the each clock cycle into the display unit.

Further, the method further includes: outputting a clock synchronization signal by the driving unit, after decompressing from the compressed package the display data to be written into the display unit within one clock cycle and before writing the display data to be written into the display unit within one clock cycle into the display unit.

Further, the driving unit synchronizes the writing of the display data by using the clock synchronization signal.

Further, the display data is compressed and sent by a host unit.

Further, the driving unit is a driving integrated circuit, the host unit is a main controller, and the display unit is an array substrate.

Further, when decompressing from the compressed package the display data to be written into the display unit within one clock cycle, the driving unit decompresses from the compressed package display data other than the display data to be written into the display unit within one clock cycle.

Further, a size of the compressed package of the display data to be written into the display unit within at least two clock cycles is smaller than or equal to a capacity of the cache of the driving unit.

A display apparatus is provided in one embodiment of the present disclosure, including a host unit, a driving unit and a display unit. The host unit is configured to compress, into a compressed package, display data to be written into a display unit within at least two clock cycles and send the compressed package to a driving unit. The driving unit is configured to store the received compressed package into a cache, and when each clock cycle comes, to decompress from the compressed package display data to be written into the display unit within the each clock cycle and write the display data to be written into the display unit within the each clock cycle into the display unit.

Further, the driving unit is further configured to output a clock synchronization signal after decompressing from the compressed package the display data to be written into the display unit within one clock cycle and before writing the display data to be written into the display unit within one clock cycle into the display unit.

Further, the driving unit synchronizes the writing of the display data by using the clock synchronization signal.

Further, the driving unit is a driving integrated circuit, the host unit is a main controller, and the display unit is an array substrate.

Further, the display apparatus is a liquid crystal display apparatus or an organic light emitting diode display apparatus.

Further, the driving unit is further configured to, when decompressing from the compressed package the display data to be written into the display unit within one clock cycle, decompress from the compressed package display data other than the display data to be written into the display unit within one clock cycle.

Further, a size of the compressed package of the display data to be written into a display unit within at least two clock cycles compressed by the host unit is smaller than or equal to a capacity of the cache of the driving unit.

A mobile terminal is further provided in one embodiment of the disclosure, including the display apparatus described above.

According to the method for writing display data provided in one embodiment of the present disclosure, display data to be written into the display unit within at least two clock cycles is compressed into a compressed package and the compressed package is sent to the driving unit; and the driving unit stores the received compressed package into the cache of the driving unit, and when each clock cycle comes, the driving unit decompresses from the compressed package display data to be written into the display unit within the each clock cycle and writes the display data into the display unit. Since the number of times of sending the display data to the driving unit is reduced, thus power consumption in writing the display data may be reduced significantly by the method for wiring display data provided in one embodiment of the present disclosure. Further, the data package occupies a small cache capacity, so there is no need to arrange a large capacity cache in the driving unit, thereby the display apparatus may be made light and thin. In addition, according to the embodiment of the present disclosure, the display data is compressed and then transmitted, thereby reducing consumption of transmission resources.

DETAILED DESCRIPTION

Implementation of the present disclosure may be described further in conjunctions with drawings and embodiments. The following embodiments are merely to illustrate the technical solutions of the present disclosure, but not used to limit the scope of the present disclosure.

Figure 1:
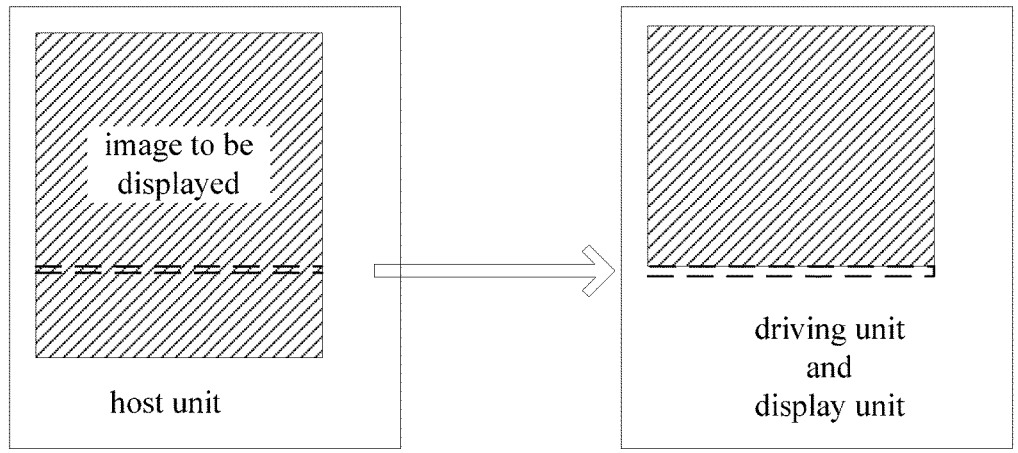
FIG. 1 is a schematic diagram showing a process of a method for writing display data in the related art.
Figure 2:
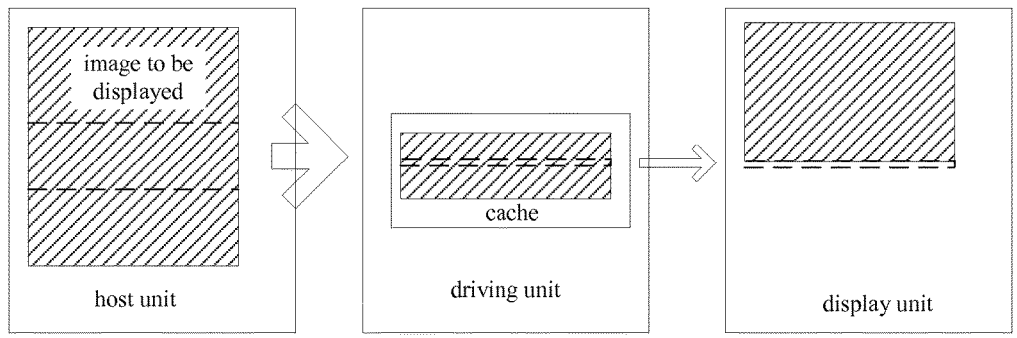
FIG. 2 is a schematic diagram showing a process of another method for writing display data in the related art.
Figure 3:
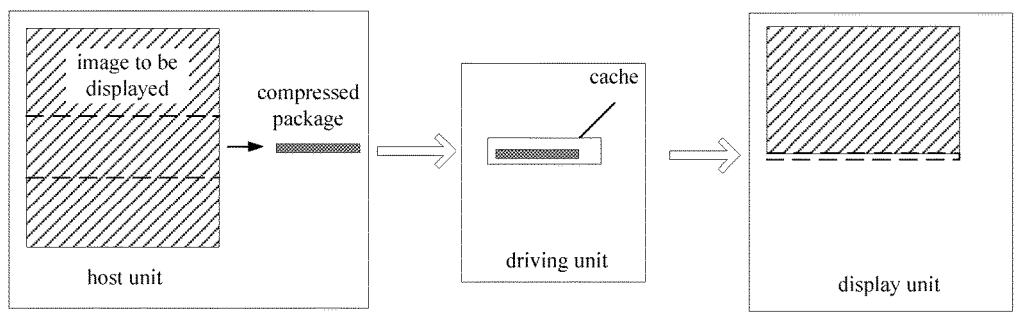
FIG. 3 is schematic diagram showing a process of a method for writing display data according to one embodiment of the present disclosure.
Figure 4:
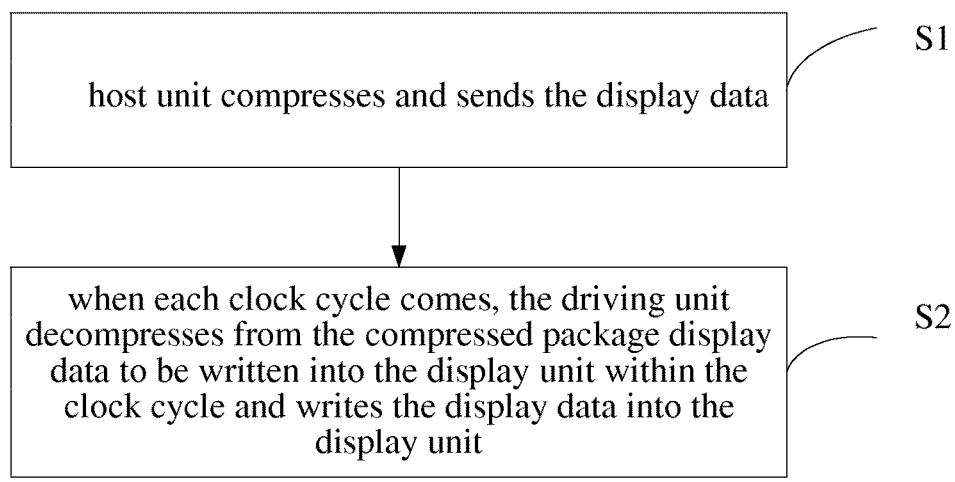
FIG. 4 is a flow chart of a method for writing display data according to one embodiment of the present disclosure.

A method for writing display data is provided in one embodiment of the present disclosure. As shown in FIG. 3 and FIG. 4, the method includes step S1 and step S2.

At the step S1, a host unit compresses display data to be written into a display unit within N clock cycles into a compressed package and sends the compressed package to a driving unit, where N is greater than 1.

At the step S2, the driving unit stores the received compressed package into a cache of the driving unit, and when each clock cycle comes, the driving unit decompresses from the compressed package display data to be written into the display unit within the clock cycle and writes the display data into the display unit.

In practical application, a process of writing one frame of image data takes a plurality of clock cycles. For example, supposing that there are M rows of pixels in a crystal liquid display apparatus, then one frame of image data may totally include M rows, and a process of writing all the data into the display unit may take M clock cycles. The number (N) of clock cycles referred in one embodiment of the present disclosure may be equal to the number of rows of image data (i.e., N=M) or smaller than the number of rows of image data (i.e., N<M), i.e., all the image data may be sent to the driving unit at a time or at a plurality of times. N may be set based on the cache of the driving unit or at random, and a size of N may be set in such a manner that a size of the compressed package of the display data sent at a time is not greater than the capacity of the cache of the driving unit.

It should be noted that, the practical application, the cache herein may be a functional module separated from the driving unit.

According to the method for writing display data provided in the embodiment of the present disclosure, the host unit compresses the display data to be written into the display unit within N clock cycles into one compressed package and sends the compressed package to the driving unit, where N is greater than 1; the driving unit stores the received compressed package into the cache of the driving unit, and when each clock cycle comes, the driving unit decompresses from the compressed package only the display data to be written into the display unit within the clock cycle and writes the display data into the display unit. Since the number of times of sending the display data to the driving unit is reduced, and power consumption in compressing and decompressing one data package is much smaller than power consumption in sending data, thus power consumption in writing the display data may be reduced significantly by the method for wiring display data provided in the embodiment of the present disclosure. In addition, the compressed package occupies a small capacity of the cache, so there is no need to arrange a large capacity cache in the driving unit, thereby the display apparatus may be made light and thin. In addition, according to the embodiment of the present disclosure, the display data is compressed and then transmitted, thereby reducing consumption of transmission resources.

It should be noted that, the embodiment of the present disclosure is only described with an example that when each clock cycle comes, the driving unit decompresses from the compressed package display data corresponding to the clock cycle and writes the display data into the display unit. However, in the practical application, the driving unit may decompress at a time more than one row of display data (e.g., two rows of display data) in case that the cache can hold the decompressed display data, and then there is no need to decompress the second row of display data when wiring the same, thereby reducing the number of times of decompression and then reducing power consumption of the apparatus. The simple variation made to the technical solution provided in the embodiment of the present disclosure may also fall into the scope of the present disclosure.

Furthermore, the method further includes: outputting a clock synchronization signal by the driving unit, after decompressing from the compressed package display data to be written into the display unit within one clock cycle and before writing the display data into the display unit. The clock synchronization signal is configured to synchronize this writing.

In the practical application, the driving unit herein may be a driving integrated circuit, the host unit may be a main controller, and the display unit may be an array substrate, where the driving integrated circuit serving as the driving unit may converse the display data into data voltages and input the data voltages to data voltage storage capacitors of each pixel in the array substrate. The array substrate herein may be a liquid crystal display (LCD) array substrate or an organic light-emitting diode (OLED) array substrate.

A display apparatus is further provided in one embodiment of the present disclosure, including a host unit, a driving unit and a display unit.

The host unit is configured to compress into a compressed package display data to be written into the display unit within N clock cycles and send the compressed package to the driving unit, where N is greater than 1.

The driving unit is configured to store the received compressed package into a cache of the driving unit, and when each clock cycle comes, the driving unit decompresses from the compressed package display data to be written into the display unit within the clock cycle and writes the display data into the display unit.

Furthermore, the driving unit is further configured to output a clock synchronization signal after decompressing from the compressed package the display data to be written into the display unit within one clock cycle and before writing the display data into the display unit.

Furthermore, the driving unit is further configured to delete the compressed package after writing all the display data of the compressed package into the display unit.

Furthermore, the driving unit is a driving integrated circuit, the host unit is a main controller, and the display unit is an array substrate.

Furthermore, the display apparatus is an LCD display apparatus or an OLED display apparatus.

The display apparatus herein may be any product or component having displaying function, such as an electronic paper, a cell phone, a tablet computer, a television, a displayer, a laptop, a digital photo frame and a navigator.

A mobile terminal is further provided in one embodiment of the present disclosure, including the display apparatus hereinabove.

The above description is merely optional embodiments of the present disclosure. It should be noted that, several modifications and improvements made by those skilled in the art without departing from the principle of the present disclosure may also fall into the scope of the present disclosure.

What is claimed is:

1. A method for writing display data, comprising:
   compressing, into a compressed package, display data to be written into a display unit within at least two clock cycles, and sending the compressed package to a driving unit; and
   storing, by the driving unit, the received compressed package into a cache, and when each clock cycle comes, decompressing from the compressed package the display data to be written into the display unit within each clock cycle, and writing the display data to be written into the display unit within each clock cycle directly into the display unit.

2. The method according to claim 1, further comprising: outputting a clock synchronization signal by the driving unit, after decompressing from the compressed package the display data to be written into the display unit within one clock cycle and before writing the display data to be written into the display unit within one clock cycle into the display unit.

3. The method according to claim 2, wherein the driving unit uses the clock synchronization signal to synchronize the writing of the display data.

4. The method according to claim 1, wherein the display data is compressed and sent by a host unit.

5. The method according to claim 4, wherein the driving unit is a driving integrated circuit, the host unit is a main controller, and the display unit is an array substrate.

6. The method according to claim 5, wherein the writing the display data to be written into the display unit within each clock cycle directly into the display unit comprises:
   converting, by the driving integrated circuit, the display data to be written into the display unit within each clock cycle into data voltages, and inputting the data voltages to data voltage storage capacitors of each pixel in the array substrate.

7. The method according to claim 1, wherein when decompressing, by the driving unit, from the compressed package the display data to be written into the display unit within one clock cycle, the method further comprises decompressing from the compressed package display data other than the display data to be written into the display unit within one clock cycle.

8. The method according to claim 1, wherein a size of the compressed package of the display data to be written into the display unit within at least two clock cycles is smaller than or equal to a capacity of the cache of the driving unit.

9. A display apparatus, comprising:
   a host unit;
   a driving unit; and
   a display unit,
   wherein the host unit is configured to compress, into a compressed package, display data to be written into the display unit within at least two clock cycles and send the compressed package to the driving unit, and
   wherein the driving unit is configured to store the received compressed package into a cache, and when each clock cycle comes, to decompress from the compressed package display data to be written into the display unit within each clock cycle and write the display data to be written into the display unit within each clock cycle directly into the display unit.

10. The display apparatus according to claim 9, wherein the driving unit is further configured to output a clock synchronization signal after decompressing from the compressed package the display data to be written into the display unit within one clock cycle and before writing the display data to be written into the display unit within one clock cycle into the display unit.

11. The display apparatus according to claim 10, wherein the driving unit synchronizes the writing of the display data by using the clock synchronization signal.

12. The display apparatus according to claim 9, wherein the driving unit is a driving integrated circuit, the host unit is a main controller, and the display unit is an array substrate.

13. The display apparatus according to claim 12, wherein the driving unit is further configured to, convert the display data to be written into the display unit within each clock cycle into data voltages, and input the data voltages to data voltage storage capacitors of each pixel in the array substrate.

14. The display apparatus according to claim 9, wherein the display apparatus is a liquid crystal display apparatus or an organic light emitting diode display apparatus.

15. The display apparatus according to claim 9, wherein the driving unit is further configured to, when decompressing from the compressed package the display data to be written into the display unit within one clock cycle, decompress from the compressed package display data other than the display data to be written into the display unit within one clock cycle.

16. The display apparatus according to claim 9, wherein a size of the compressed package of the display data to be written into the display unit within at least two clock cycles compressed by the host unit is smaller than or equal to a capacity of the cache of the driving unit.

17. A mobile terminal, comprising the display apparatus according to claim 9.

* * * * *